(12) United States Patent
Hannuksela et al.

(10) Patent No.: US 8,107,539 B2
(45) Date of Patent: Jan. 31, 2012

(54) METHOD FOR ERROR CONCEALMENT IN VIDEO SEQUENCES

(75) Inventors: Miska Hannuksela, Tampere (FI); Ye-Kui Wang, Tampere (FI)

(73) Assignee: Nokia Corporation, Espoo (FI)

( * ) Notice: Subject to any disclaimer, the term of this patent is extended or adjusted under 35 U.S.C. 154(b) by 880 days.

(21) Appl. No.: 10/621,259

(22) Filed: Jul. 15, 2003

(65) Prior Publication Data

US 2004/0139462 A1 Jul. 15, 2004

Related U.S. Application Data (60) Provisional application No. 60/396,489, filed on Jul. 15, 2002.

(51) Int. Cl.
*H04N 7/18* (2006.01)
(52) U.S. Cl. .............................. 375/240.26; 375/240.27
(58) Field of Classification Search . 375/240.01–240.29
See application file for complete search history.

(56) References Cited

U.S. PATENT DOCUMENTS

| | | | | |
|---|---|---|---|---|
| 5,561,477 A * | 10/1996 | Polit | ............................ | 348/700 |
| 5,727,088 A | 3/1998 | Kim | ............................ | 382/238 |
| 5,767,922 A * | 6/1998 | Zabih et al. | .................. | 348/700 |
| 5,802,079 A | 9/1998 | Wang | ............................. | 371/42 |
| 5,844,594 A * | 12/1998 | Ferguson | ...................... | 725/131 |
| 6,084,641 A | 7/2000 | Wu | ................................ | 348/722 |
| 6,310,915 B1 * | 10/2001 | Wells et al. | .............. | 375/240.03 |
| 6,404,817 B1 * | 6/2002 | Saha et al. | ................ | 375/240.27 |
| 6,594,790 B1 * | 7/2003 | Sato et al. | ..................... | 714/746 |
| 6,606,409 B2 | 8/2003 | Warnick et al. | ............... | 382/173 |
| 6,611,561 B1 * | 8/2003 | Hannuksela et al. | ..... | 375/240.27 |
| 6,721,361 B1 * | 4/2004 | Covell et al. | ............. | 375/240.14 |
| 6,865,227 B2 * | 3/2005 | Chan | ......................... | 375/240.16 |
| 6,959,044 B1 * | 10/2005 | Jin et al. | .................... | 375/240.12 |
| 6,990,151 B2 * | 1/2006 | Kim et al. | ................. | 375/240.27 |
| 7,027,509 B2 | 4/2006 | Jun et al. | .................. | 375/240.16 |
| 7,110,454 B1 * | 9/2006 | Chakraborty | ............ | 375/240.16 |
| 7,302,001 B2 * | 11/2007 | Wang et al. | ................ | 375/240.1 |

(Continued)

FOREIGN PATENT DOCUMENTS

EP 1113614(A2) 7/2001

(Continued)

OTHER PUBLICATIONS

Joint Video Team (JVT) of ISO/IEC MPEG and ITU-T VCEG; "Draft ITU-T Rec H.264 | ISO/IEC 14496-10, JVT-D015 draft 5"; pp. 1-136; Jun. 2002.

(Continued)

*Primary Examiner* — Andy Rao
(74) *Attorney, Agent, or Firm* — Ware, Freesola, Van Der Sluys & Adolphson, LLP (57) ABSTRACT

A method and device for error concealment in a video sequence. When there is a scene transition in the video sequence and an error occurs in a picture belonging to the scene transition, an error concealment procedure based on the type of scene transition is used to conceal the error. Information about the scene transition type is provided to a decoder in a supplemental enhancement information message. If the scene transition is a gradual scene transition, a spatio-temporal error concealment algorithm is used to conceal the picture. If the scene transition is a scene cut and only part of the picture is lost or corrupted, a spatial error concealment is used to conceal the lost or corrupted part of the picture. If a whole picture belonging to the scene cut is lost or corrupted and the picture starts a new scene, it is not concealed.

27 Claims, 2 Drawing Sheets

U.S. PATENT DOCUMENTS

| | | | |
|---|---|---|---|
| 7,551,673 B1 * | 6/2009 | Oh et al. | 375/240.16 |
| 7,751,683 B1 * | 7/2010 | Belknap | 386/278 |
| 2001/0040926 A1 | 11/2001 | Hannuksela et al. | 375/240.27 |
| 2004/0005007 A1 * | 1/2004 | Viscito et al. | 375/240.25 |

FOREIGN PATENT DOCUMENTS

| | | |
|---|---|---|
| EP | 132812 (A1) | 9/2001 |
| JP | 6311502 (A) | 11/1994 |
| RU | 99103620 A | 3/2001 |
| SU | 1109945 (A1) | 8/1984 |

OTHER PUBLICATIONS

Joint Video Team (JVT) of ISO/IEC MPEG and ITU-T VCEG; "Draft ITU-T Rec H.264 | ISO/IEC 14496-10, JVT-C039, Annex D"; pp. 109-112; May 2002.

Joint Video Team (JVT) of ISO/IEC MPEG and ITU-T VCEG; "Draft ITU-T Rec H.264 | ISO/IEC 14496-10, JVT-D015 draft 5, Annex C"; pp. 148-152; Jun. 2002.

ITU Video Coding Experts Group (VCEG); "VCEG-N79r1"; pp. 1-3; Sep. 2001.

"A Robust Scene-Change Detection Method for Video Segmentation", Chung-Lin Huang, et al, December 2001, pp. 1281-1288, IEEE Transactions on Circuits and Systems for Video Technology, vol. 11, No. 12.

"Comparison of error Concealment techniques for an MPEG-2 video decoder in terrestrial TV-broadcasting", Susanna Kaiser, et al, May 1, 1999, Signal Processing image Communication, vol. 14, No. 6-8, pp. 655-676.

* cited by examiner

METHOD FOR ERROR CONCEALMENT IN VIDEO SEQUENCES

This application is based on and claims priority under 35 U.S.C. § 119(e) to U.S. provisional patent application Ser. No. 60/396,489, filed Jul. 15, 2002.

FIELD OF THE INVENTION

The present invention relates generally to video coding and, in particular, to concealing artifacts introduced by errors.

BACKGROUND OF THE INVENTION

A video sequence consists of a series of still pictures or frames. Video compression methods are based on reducing the redundant and perceptually irrelevant parts of video sequences. The redundancy in video sequences can be categorized into spectral, spatial and temporal redundancy. Spectral redundancy refers to the similarity between the different color components of the same picture. Spatial redundancy results from the similarity between neighboring pixels in a picture. Temporal redundancy exists because objects appearing in a previous image frame are also likely to appear in the current image frame. Compression can be achieved by taking advantage of this temporal redundancy and predicting the current picture from another picture, called a reference picture. Further compression is achieved by generating motion compensation data that describes the motion between the current picture and the reference picture.

Video compression methods typically differentiate between pictures that utilize temporal redundancy reduction and those that do not. Compressed pictures that do not utilize temporal redundancy reduction methods are usually called INTRA- (or I-) frames or pictures. Temporally predicted images are usually forwardly predicted from a picture occurring before the current picture and are called INTER- or P-frames. A compressed video clip typically consists of a sequence of pictures, which can be roughly categorized into temporally independent INTRA pictures and temporally differentially coded INTER pictures. INTRA pictures are typically used to stop temporal propagation of transmission errors in a reconstructed video signal and to provide random access points into the video bit-stream. Since the compression efficiency provided by INTRA pictures is normally lower than that provided by INTER pictures, they are generally used sparingly, especially in low bit-rate applications.

A video sequence can be composed of many camera scenes or shots. A shot is defined as a set of continuous frames or pictures taken with one camera. Generally, the frames within one shot are highly correlated. However, in a typical video sequence, the picture contents are significantly different from one scene to another and therefore the first picture of a scene is typically INTRA-coded. Changes between the different shots in a video sequence are referred to as "scene transitions". Scene transitions may take a number of different forms. For example, one shot may end and another may begin abruptly at a "scene cut". In other cases, the scene transition is gradual and occurs over more than one frame. Examples of gradual scene transitions are "dissolves", "fades" (fade-in, fade-out) and "wipes".

Compressed video is easily corrupted by transmission errors, mainly for two reasons. Firstly, due to the utilization of temporal predictive differential coding (INTER frames), errors are propagated both spatially and temporally. Secondly, the use of variable length codes increases the susceptibility of the video bit-stream to errors. There are many ways for a receiver (video decoder) to address the corruption introduced in the transmission path. In general, on receipt of a signal, transmission errors are first detected and then corrected or concealed by the decoder. The term "error correction" refers to the process of recovering the erroneous data perfectly, as if no errors had been introduced in the first place, while "error concealment" refers to the process of concealing the effects of transmission errors so that they are hardly visible in the reconstructed video sequence.

Currently, the video decoder being developed by the Joint Video Team (JVT) of the ISO/IEC Motion Pictures Expert Group and the ITU-T Video Coding Experts Group for the ITU-T H.264/MPEG-4 part 10 AVC video codec lacks a method for deciding how transmission errors in INTRA-coded frames and scene transition frames are to be concealed and it is in this context that the current invention has been developed.

SUMMARY OF THE INVENTION

It is an object of the present invention to provide a method by which an appropriate form of error concealment can be chosen for frames that belong to scene transitions in a video sequence. The method is equally applicable to abrupt scene transitions (i.e. scene cuts) and gradual scene transitions, for example fades, wipes and dissolves etc.

Two kinds of information are needed in order to perform effective error concealment of frames that belong to scene transitions: 1) information about the frames in which the shot change starts and ends; and 2) the type of the scene transition (cut, dissolve, fade, wipe, etc.) involved. Since the two types of information just described are not necessary for correct decoding of the video coding layer (VCL) data, the present invention proposes that information relating to scene transitions is provided as Supplemental Enhancement Information (SEI) and included in the encoded video bit-stream as a Supplemental Enhancement Information (SEI) message. All necessary information required for concealment of errors occurring in frames that belong to scene transitions can then be inferred from the SEI message.

According to the invention, each scene of a video sequence is associated with a scene identifier value. The scene identifier values of consecutive scenes differ from each other and thus a video decoder can conclude that a scene change has occurred when it receives a scene identifier different from the one it previously received. Frames in a scene transition period are associated with two scene identifier values, one from both scenes in the transition. In addition, gradual scene transitions are associated with a particular transition type, which can be dissolve, fade-in, fade-out, wipe, or none-of-those-mentioned (i.e. some other type of transition). This rough categorization provides the decoder with sufficient guidance, enabling it to choose a suitable error concealment algorithm for concealment of data loss or corruption during a scene transition.

Thus, according to the first aspect of the present invention, there is provided a method for concealing an error in a frame of a video sequence, the video sequence comprising at least a first scene and a second scene, the second scene having a scene transition from the first scene, wherein the scene transition comprises a number of frames and the scene transition is one of a number of types. The method comprises:

identifying the type of scene transition; and applying an error concealment procedure to conceal an error in a frame belonging to the transition based on the identified type of scene transition.

The identified type of scene transition can be a scene cut or a gradual scene transition.

Preferably, if a whole picture belonging to the scene cut is lost, the lost picture is not concealed.

Preferably, if part of a picture belonging to the scene cut is lost or corrupted, a spatial error concealment algorithm is applied to conceal the lost or corrupted part of the picture.

Preferably, if a whole picture belonging to the gradual transition is lost or corrupted, a spatio-temporal error concealment algorithm is applied to conceal the lost or corrupted part of the picture.

Preferably, if part of a picture belonging to the gradual transition is lost or corrupted, a spatio-temporal error concealment algorithm is applied to conceal the lost or corrupted part of the picture.

Preferably, the information indicative of the identified scene transition is provided to a decoder in a supplemental enhancement information message so as to allow the decoder to conceal the error based on said information.

Advantageously, the information indicative of the identified scene transition includes an indication of a scene transition type, and the information indicative of the identified scene transition is provided for each frame belonging to the transition.

According to the second aspect of the present invention, there is provided a video coding device for encoding a video sequence into a data stream, the video sequence comprising at least a first scene and a second scene and having a scene transition from the first scene, wherein the scene transition comprises a number of frames and the scene transition is one of a number of types. The video coding device comprises:

means for identifying frames associated with the transition;

means for providing information about the type of transition.

According to the third aspect of the present invention, there is provided a video decoding device for decoding a video sequence from a data stream, the video sequence comprising at least a first scene and a second scene and having a scene transition from the first scene, wherein the scene transition comprises a number of frames and the scene transition is one of a number of types. The video coding device comprises:

means for receiving the data stream; and an error concealment algorithm for concealing an error in a frame belonging to the transition based on the type of scene transition.

The present invention will become apparent upon reading the description taken in conjunction with FIGS. 1 to 3.

BEST MODE FOR CARRYING OUT THE INVENTION

As explained above, Supplemental Enhancement Information (SEI) included in an encoded video bit-stream contains information that is not necessary to correctly decode the encoded video data, but which is nevertheless helpful for decoding or presentation purposes. Thus, SEI information is an ideal vehicle for carrying information about the scene to which a particular frame of a video sequence belongs and for providing information about scene transitions.

According to the ITU-T H.264/MPEG-4 part 10 AVC video coding standard, an SEI element contains one or more SEI messages. Each SEI message consists of an SEI header and an SEI payload. The type and size of the SEI payload are coded using an extensible syntax. The SEI payload size is indicated in bytes. Valid SEI payload types are listed in Annex C of JVT committee draft (see document JVT_D015d5).

The SEI payload may be an SEI payload header. For example, a payload header may indicate the picture to which the particular data belongs. The payload header is defined for each payload type separately. Definitions of SEI payloads are specified in Annex C of JVT committee draft (again see document JVT_D015d5).

The transmission of SEI units is synchronous relative to other NAL (Network Abstraction Layer) units. An SEI message may concern a slice, a part of a picture, a picture, any group of pictures, a sequence in the past, a sequence being currently decoded, or a sequence to be decoded in the future. An SEI message may also concern one or more NAL units previous or next in the transmission order.

Table 1 below defines the SEI payload syntax as used in the ITU-T H.264/MPEG-4 part 10 AVC video coding standard, while Table 2 presents the particular syntax used in connection with the signaling of scene information, as proposed according to the present invention.

TABLE 1

SEI Payload Syntax

| | Category | Descriptor |
|---|---|---|
| sei_payload( PayloadType, PayloadSize) { | | |
|   if( PayloadType = = 1 ) | | |
|     temporal_reference( PayloadSize, PayloadSize) | 7 | |
|   else if( PayloadType = = 2 ) | | |
|     clock_timestamp( PayloadSize, PayloadSize) | 7 | |
|   else if( PayloadType = = 3 ) | | |
|     panscan_rect( PayloadSize, PayloadSize ) | 7 | |
|   else if( PayloadType = = 4 ) | | |
|     scene_information( PayloadSize, Payload Size ) | 7 | |
|   else | | |
|     reserved | | variable |
|   if( !byte_aligned( ) ) { | | |
|     bit_equal_to_one | | f(1) |
|     while( !byte_aligned( ) ) | | |
|     bit_equal_to_zero | | f(1) |
|   } | | |
| } | | |

TABLE 2

SEI Scene Information Syntax

| | Category | Descriptor |
|---|---|---|
| scene_information( PayloadType, PayloadSize ) { | | |
|   scene_identifier | | u(8) |
|   if( more_sei_payload_data( ) ) { | | |
|     second_scene_identifier | | u(8) |
|     if( more_sei_payload_data( ) ) | | |

TABLE 2-continued

SEI Scene Information Syntax

| | Category | Descriptor |
|---|---|---|
| scene_transition_type | | e(v) |
| } | | |
| } | | |

The scene information parameters given in Table 2 concern the next NAL unit containing coded macroblock data in transmission order.

scene_identifier: A scene is defined as a set of continuous frames taken by one camera. Generally, the frames within one scene are highly correlated. According to the invention, frames in a given scene share the same scene_identifier parameter value and consecutive scenes in coded order should not have the same scene_identifier parameter value.

second_scene_identifier: If present, the second_scene_identifier parameter indicates that the next NAL unit containing coded macroblock data belongs to a frame that contains picture data from two scenes. In other words, the frame belongs to a gradual scene transition. The second_scene_identifier parameter is the scene identifier of the latter scene in coded order.

scene_transition_type: If no scene_transition_type parameter is present in the SEI scene information, this indicates that the scene transition type is unknown, undefined, or irrelevant. If present, the values given in Table 3 below are valid:

TABLE 3

Scene Transition Types According to a
Preferred Embodiment of the Invention

| Value | Description |
|---|---|
| 0 | Dissolve |
| 1 | Fade-out |
| 2 | Fade-in |
| 4 | Wipe |
| Other values | Reserved |

The way in which the scene information described above is used in the decoder process to handle data loss or corruption will now be described.

If a whole picture is lost just before the current one and the scene has changed since the previously received picture, the lost picture should not be concealed, because it starts a new scene. If a whole picture is lost just before the current one and no scene change has occurred since the previously received picture, the decoder conceals the lost picture. If a whole picture is lost during a transition period, the decoder utilizes the indicated scene transition type when concealing the lost picture.

If a part of the current picture is lost or corrupted, and if a scene information SEI message is associated with the picture, the decoder performs the following actions:

1). If the scene has changed since the previous picture was received, the decoder applies a spatial error concealment algorithm to conceal the lost or corrupted parts of the current picture.
2). If the scene has not changed since the previously received picture, the decoder uses a spatio-temporal error concealment algorithm.
3). If the current picture belongs to a scene transition, the decoder utilizes the indicated scene transition type when concealing the lost picture.

According to the invention, an encoder should generate scene information SEI messages if it operates in an error-prone transmission environment, or if there is a need to create video content description based on the encoded video signal. Even if there is no immediate need for content description, a later need may arise for some types of video content, such as entertainment video. Therefore, according to the present invention, it is preferable that encoders always generate scene information SEI messages if possible.

Accordingly, an encoder creates a scene information SEI message for each scene cut and gradual transition. For each scene-cut picture, there is an associated scene information SEI message that can be repeated later for error resilience. For each gradual scene transition, there is a (preferably repeated) scene information SEI message associated with the first transition picture (i.e. the first picture which is composed of both the transit-from and the transit-to scene). For each gradual scene transition, there is also a (preferably repeated) scene information SEI message associated with the first picture after the last transition picture (the last transition picture refers to the last picture which is composed of both the transit-from and the transit-to scene). As mentioned above, the value of the scene_identifier parameter is different in consecutive scenes.

In a packet-oriented transport environment, the transport packetizer duplicates each scene information SEI message at least in two packets, if possible, in order to guarantee correct reception of at least one occurrence of the message. In RTP transport, the packetizer uses compound packets to associate a scene information SEI message to coded picture contents. In a byte-stream-oriented transport environment, each scene information SEI message is at least duplicated.

Figure 1:
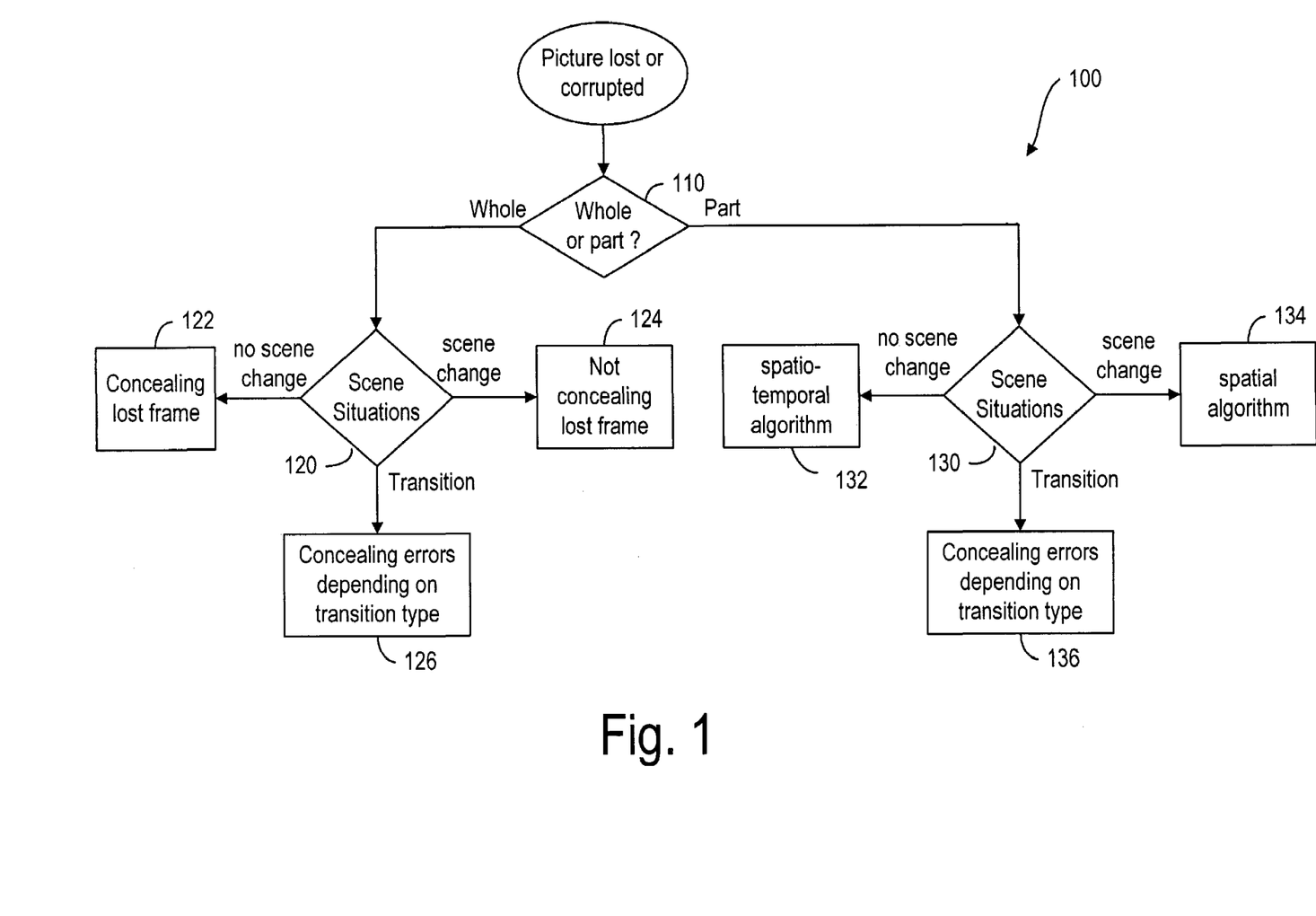
FIG. 1 is a flowchart illustrating the error concealment method, according to the present invention, showing how an appropriate error concealment method is chosen for a picture in a scene transition according to the type of scene transition.

The method of error concealment in video sequences by signaling shot changes, according to the prevent invention, is illustrated in the flowchart 100 in FIG. 1.

When the decoder encounters data loss or corruption in the decoding process, the decoder decides at step 110 whether the loss or corrupted picture is a whole picture or a part of the picture. If the whole picture has been lost, the decoder determines what type of loss situation is occurring (step 120). If a whole picture was lost just before the current one and the scene has changed since the previously received picture (for example, as indicated by the scene_identifier parameter value in the received SEI information), the lost picture should not be concealed because in this case, as explained above, the lost picture represents the start of a new scene (step 124). If a whole picture was lost just before the current one and no scene change occurred since the previously received picture, the decoder conceals the lost picture, as shown at step 122. If a whole picture was lost during a transition period, the decoder utilizes the indicated scene transition type (obtained from the received SEI information) when concealing the lost picture, as shown at step 126.

If a part picture has been lost, the decoder determines what type of loss situation is occurring (step 130). If a part of the current picture was lost or corrupted, and if a scene information SEI message is associated with the picture, the decoder should perform the following actions: If the scene has changed since the previously received picture, the decoder applies a spatial error concealment algorithm to conceal the lost or corrupted parts of the current picture, as shown at step 134. If the scene has not changed since the previous received picture, the decoder uses a spatio-temporal error concealment algorithm, as shown at step 132. If the current picture belongs to a scene transition, the decoder utilizes the indicated scene transition type when concealing the lost picture, as shown at step 136.

Figure 2:
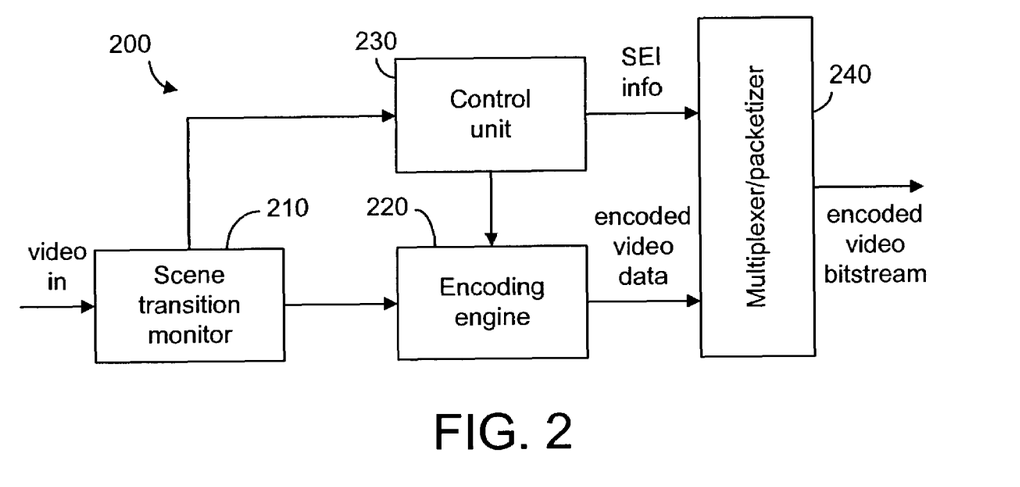
FIG. 2 is a block diagram illustrating a video encoder implemented according to the present invention so as to provide an encoded data stream that includes information indicative of scene transitions for error concealment purposes.

In order to carry out the error concealment method as illustrated in the flowchart 100 of FIG. 1, a video encoder implemented according to the invention should be able to monitor scene changes and convey information indicative of the scene changes in the bit-stream generated by the encoder. A block diagram of such a video encoder 200 is shown in FIG. 2. As shown in the Figure, a video encoder implemented in accordance with the invention includes a scene transition monitor 210, an encoding engine 220, a control unit 230 and a multiplexer/packetizer unit 240. A video input signal representative of a video sequence is applied to an input terminal of the video encoder and fed via scene transition monitor 210 to the video coding engine 220, where the individual frames of the video sequence are coded e.g. in INTRA- or INTER-format. The scene transition monitor examines the frames, for example by calculating a cumulative sum of absolute differences between pixels in consecutive frames of the sequence, or by applying any other method of scene detection known from prior art, in order to identify the various scenes which make up the video sequence. Scene transition monitor 210 provides an indication of the scene to which each frame belongs to control unit 230. When a transition between scenes (e.g. a scene cut, fade, dissolve, wipe etc.) is detected, scene transition monitor 210 also provides an indication of the type of transition to control unit 230. The control unit assigns an identifier (e.g. a number) to each scene identified by the scene transition monitor and associates the identifier with each frame that is identified as belonging to the scene in question. Furthermore, when a scene transition is detected, control unit 230 instructs video coding engine 220 to encode the first frame of the new scene in INTRA-coded format. Advantageously, all subsequent frames belonging to the new scene are then encoded in INTER-coded format unless it becomes necessary to encode a given frame in another format for some reason. In a preferred embodiment of the invention, the control unit 230 associates Supplemental Enhancement Information (SEI information) with each frame belonging to a scene transition and passes the SEI information to multiplexer/packetizer 240. Advantageously, the SEI information for frames that form part of a scene transition is formed as previously described in the Best Mode for Carrying out the Invention, presented earlier in the text. The multiplexer/packetizer also receives encoded video data from video encoding engine 220 and forms a single bit-stream from the encoded video data and the SEI information. The bit-stream is then transmitted, for example to a corresponding video decoder (see FIG. 3) via a transmission channel or to a storage device (not shown) for later retrieval and viewing.

Figure 3:
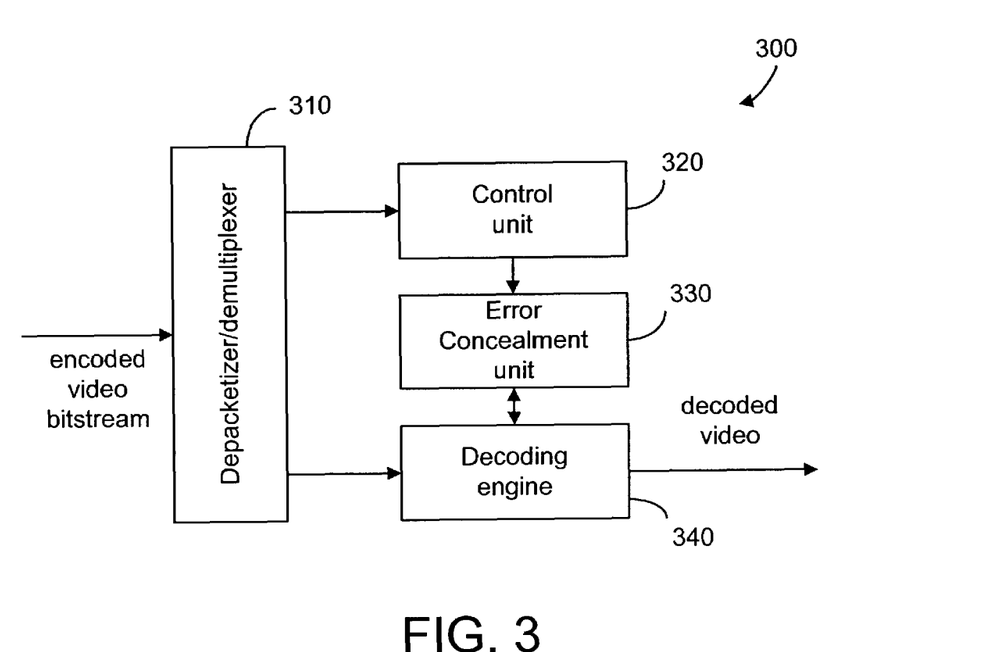
FIG. 3 is a block diagram illustrating a video decoder implemented in accordance with the present invention and corresponding to the video encoder illustrated in FIG. 2.

FIG. 3 is a block diagram showing a video decoder 300 implemented in accordance with the present invention and corresponding to the video encoder described in connection with FIG. 2. As can be seen from FIG. 3, the video decoder according to the invention includes a depacketizer/demultiplexer 310, a control unit 320, an error concealment unit 330 and a video decoding engine 340. The depacketizer/demultiplexer receives an encoded bit-stream representative of a video sequence in the form of data packets from a transmission channel. It reconstructs the encoded video bit-stream from the received data packets received and separates the video bit-stream into its constituent parts (i.e. into different types of information relating to the encoded video frames of the sequence). According to the invention, the depacketizer/demultiplexer extracts Supplemental Enhancement Information containing, among other things, information relating to scene transitions from the encoded video bit-stream and passes the SEI information to control unit 320. Data necessary for decoding the encoded video frames is passed from depacketizer/demultiplexer 310 to video decoding engine 340, where the individual frames of the video sequence are reconstructed using, for example, INTRA and INTER decoding techniques. As each frame is decoded, video decoding engine 340 examines the received video data for errors that may have been introduced during transmission of the encoded video bit-stream over the transmission channel from the encoder. If the video decoding engine detects that a particular frame contains such errors, or the frame is so badly corrupted that it cannot be decoded at all (i.e. the frame is effectively lost), it attempts to conceal the error or the entire frame using an appropriate error concealment algorithm. According to the present invention, choice of an appropriate error concealment method is made by error concealment unit 330. The error concealment unit receives information about the scene to which each frame belongs from control unit 320. In the case of frames that are part of a scene transition, control unit 320 also passes information relating to the type of scene transition to the error concealment unit. Thus, when decoding engine 340 detects an error affecting a frame that is part of a scene transition, error concealment unit 330 is able to choose a method suitable for concealing the error by considering the scene to which the frame belongs and taking into account the type of scene transition. Preferably, in making this choice, error concealment unit 330 applies the selection method described in the Best Mode for Carrying out the Invention presented above. Video decoding engine 340 then conceals the error in the frame using the selected error concealment algorithm and outputs the decoded frame e.g. for display on a display device (not shown).

In order to verify the effectiveness of the error concealment methods for scene cut and scene transition frames according to the invention, a series of simulation experiments were performed using a video encoder and decoder implemented according to the ITU-T H.264/MPEG-4 part 10 AVC video coding standard, modified in order to operate in accordance with the method of the present invention. These simulation experiments are detailed below.

A. Simulations in Error Concealment of Random Access Frames and Scene Cuts

In this simulation, the sequences and bit-rates proposed in document VCEG-N79r1 were used and the common conditions for packet-lossy environments (as defined in VCEG-N79r1) were applied. In addition, in order to simulate the effects of error concealment for scene-cut frames, an artificial sequence of 30 frames with regular scene cuts was constructed from the well-known sequences "News", "Foreman", "Coastguard", "Carphone", and "Silent". In the following, this artificial sequence is referred to as "MixedSeq". An INTRA-frame period of about 1 second was used to enable frequent random access in all cases. For MixedSeq, such an INTRA period caused all the scene cuts to be INTRA-coded. Loss-aware R/D optimization (LA-RDO) was also used. The other coding parameters used to encode the sequences are shown below in Table 4:

TABLE 4

Encoder Parameters Used in the Simulation of Error Concealment in Random Access Frames and Scene Cuts

| | |
|---|---|
| Bitstream Mode: | RTP |
| Motion vector resolution: | ¼ pel |
| Hadamard transform: | used |
| Max search range: | 16 |
| Number of previous frames used for INTER motion search: | 5 |
| Block types enabled: | all |

TABLE 4-continued

Encoder Parameters Used in the Simulation of Error
Concealment in Random Access Frames and Scene Cuts

| | |
|---|---|
| Slice mode: | fixed size, 1400 bytes/slice |
| B-frames and SP-frames: | not used |
| Symbol mode: | UVLC |
| Data partition: | 1 partition per slice |
| Sequence header: | no sequence header |
| Search range restrictions: | none |
| Constrained INTRA prediction: | used |
| Restricted reference frames: | used |
| Number of decoders for LA-RDO: | 30 |

Error Concealment

The creation of scene information SEI messages in the encoder according to the method of the invention was simulated according to the guidelines presented in the Best Mode for Carrying out the Invention, described above, and two decoder processes were compared:
1. The standard Joint Model decoder, including the error concealment method described in Appendix D of the JVT Working Draft (see document JVT-C039).
2. The Joint Model decoder enhanced with the decoder process according to the present invention.

Bit-rate and PSNR Calculation

As stated in the common conditions specified in document VCEG-N79r1, coding parameters such as the quantization parameter were chosen to make the resulting bit-rate as close as possible to the channel bit-rate, taking into account the 40 bytes of IP/UDP/RTP headers per packet. PSNR values were calculated using each frame in the source sequence including skipped and lost frames. To reduce the effect imposed on the overall result by the first frames (the first encoded frames have a larger average size than the average size of the whole sequence), the bit-rate and the average PSNR value were calculated from the sixth coded frames. This method allows short sequences to be coded with fair results. Instead of coding 4000 frames, 300-400 frames of each designated sequence were used, to ensure that at least 100 frames were coded and at least 300 frames were used.

Packet Loss Simulation

In the simulation, it was assumed that the packet containing the parameter set (Table 4) was conveyed reliably (for example by out-of-band during the session setup), and therefore no error pattern was read for it from the error pattern file. At least one packet of the first frame should be received to avoid decoder crash. To satisfy this condition, the first packet of the first frame was always received regardless of the corresponding error pattern.

Representative Decoding Run

The coded bit-stream was decoded multiple times (each being referred to as a decoding run). The beginning loss position of the run with order n+1 continuously follows the ending loss position of the nth run. The number of decoding runs was selected so that there were at least 8000 packets in total. The overall average PSNR was obtained by averaging the average PSNR values of all the decoding runs. The representative decoding run was selected so that its average PSNR was the closest to the overall average PSNR. The instantaneous PSNR values and the decoded sequence of the representative run were stored to draw instantaneous PSNR plots and for subjective quality evaluation.

Results

As shown by the simulation results for MixedSeq@144 kbps, presented in Table 11 below, the use of INTRA error concealment for scene cuts provides better performance in terms of both objective and subjective quality than using INTER error concealment. Conversely, using INTER error concealment is consistently better than using INTRA error concealment for frames that are not scene cuts, as can be seen from the other six coding cases presented in Tables 5 to 10. This demonstrates the usefulness of the present invention.

TABLE 5

Sequence "Foreman" Encoded at 64 kbps, 7.5 frames/s

| | Result | | Packet Loss Rate (%) | | | | |
|---|---|---|---|---|---|---|---|
| Algorithm | Bitrate | QP | 0 | 3 | 5 | 10 | 20 |
| Standard Joint Model Decoder with Error Concealment Methods of Appendix D | 59.81 | 24 | 25.54 | 25.20 | 24.93 | 24.43 | 23.34 |
| Method According to the Invention | 59.81 | 24 | 25.54 | 25.29 | 25.11 | 24.64 | 23.86 |

TABLE 6

Sequence "Foreman" Encoded at 144 kbps, 7.5 frames/s

| | Result | | Packet Loss Rate (%) | | | | |
|---|---|---|---|---|---|---|---|
| Algorithm | Bitrate | QP | 0 | 3 | 5 | 10 | 20 |
| Standard Joint Model Decoder with Error Concealment Methods of Appendix D | 143.54 | 18 | 26.78 | 26.19 | 25.88 | 24.97 | 23.61 |
| Method According to the Invention | 143.54 | 18 | 26.78 | 26.43 | 26.16 | 25.53 | 24.57 |

TABLE 7

Sequence "Hall" Encoded at 32 kbps, 10 frames/s

| | Result | | Packet Loss Rate (%) | | | | |
|---|---|---|---|---|---|---|---|
| Algorithm | Bitrate | QP | 0 | 3 | 5 | 10 | 20 |
| Standard Joint Model Decoder with Error Concealment Methods of Appendix D | 29.73 | 24 | 30.53 | 29.89 | 29.53 | 28.28 | 26.79 |
| Method According to the Invention | 29.73 | 24 | 30.53 | 30.40 | 30.28 | 30.01 | 29.55 |

TABLE 8

Sequence "Irene" Encoded at 384 kbps, 30 frames/s

| | Result | | Packet Loss Rate (%) | | | | |
|---|---|---|---|---|---|---|---|
| Algorithm | Bitrate | QP | 0 | 3 | 5 | 10 | 20 |
| Standard Joint Model Decoder with Error Concealment Methods of Appendix D | 334.96 | 22 | 34.99 | 34.09 | 33.40 | 31.35 | 28.79 |
| Method According to the Invention | 334.96 | 22 | 34.99 | 34.62 | 34.32 | 33.58 | 32.35 |

TABLE 9

Sequence "Paris" Encoded at 144 kbps, 15 frames/s

| Algorithm | Result | | Packet Loss Rate (%) | | | | |
|---|---|---|---|---|---|---|---|
| | Bitrate | QP | 0 | 3 | 5 | 10 | 20 |
| Standard Joint Model Decoder with Error Concealment Methods of Appendix D | 139.18 | 28 | 26.41 | 25.34 | 24.66 | 23.44 | 21.01 |
| Method According to the Invention | 139.18 | 28 | 26.41 | 26.23 | 26.08 | 25.70 | 25.10 |

TABLE 10

Sequence "Paris" Encoded at 384 kbps, 15 frames/s

| Algorithm | Result | | Packet Loss Rate (%) | | | | |
|---|---|---|---|---|---|---|---|
| | Bitrate | QP | 0 | 3 | 5 | 10 | 20 |
| Standard Joint Model Decoder with Error Concealment Methods of Appendix D | 355.32 | 22 | 29.56 | 27.75 | 26.95 | 24.06 | 21.54 |
| Method According to the Invention | 355.32 | 22 | 29.56 | 29.20 | 28.92 | 28.33 | 27.34 |

TABLE 11

Sequence "MixedSeq" Encoded at 144 kbps, 15 frames/s

| Algorithm | Result | | Packet Loss Rate (%) | | | | |
|---|---|---|---|---|---|---|---|
| | Bitrate | QP | 0 | 3 | 5 | 10 | 20 |
| Standard Joint Model Decoder with Error Concealment Methods of Appendix D | 124.31 | 21 | 30.37 | 30.04 | 29.86 | 29.17 | 28.23 |
| Method According to the Invention | 124.31 | 21 | 30.37 | 30.06 | 29.88 | 29.26 | 28.36 |

B. Simulations in Error Concealment of Fades

In order to simulate the effects of error concealment for fade-out and fade-in frames, two artificial sequences with 10 fade-out frames, 10 fade-in frames and 10 normal frames were produced. One was made from a combination of "News" and "Akiyo" (with low motion), the other was made from "Carphone" and "Foreman" (with moderate motion). After encoding using JVT Joint Model encoder and an I-P-P-P coding pattern, loss of some of the fading frames was simulated and the lossy bit-steams were fed to the decoder. Two different error concealment methods were used to conceal errors introduced by loss of the fading frames:
1. The conventional error concealment method in the JVT codec (as described in Appendix D of the JVT Working Draft (JVT-C039)); and
2. The special error concealment method for fades according to the invention, as described below.

Error Concealment Method

A missing frame in a fade is concealed by copying and scaling the pixel values of the previous frame. However, if there is only one previous frame in the scene transition period, no scaling is carried out. If Mn' is the average Y (luminance) pixel value of the previous frame and Mn" is the average Y pixel value of the frame before the previous frame, the scaling factor f is calculated as follows:

$$f=(2*Mn'-Mn'')/Mn'$$

The concealed Y, U and V values for pixel (Ys, Us, Vs) are calculated from the spatially corresponding values of the previous picture (Y, U, V) as follows:

$$Ys=f*Y$$

$$Us=f*(U-128)+128$$

$$Vs=f*(V-128)+128$$

As shown by the simulation results, using the special error concealment method for fades, according to the present invention, provides significantly better performance in both objective and subjective quality than the conventional error concealment method defined in Appendix D of the JVT video coding recommendation. It may be argued that the visual quality of a gradual scene transition is not important. However, bad error concealment during a scene transition not only results in bad quality transition frames, but also leads to bad quality normal frames after the scene transition, due to temporal error propagation.

Error Concealment of Dissolves

Below two methods for error concealment of a lost frame during a dissolve are presented. If the decoder is able to buffer a sufficient number of frames before decoding, algorithm A should be used. Otherwise, algorithm B should be used.

Algorithm A:

If the pre-decoder buffer contains any INTRA-coded frame of the second scene (a frame after the transition period), the INTRA-frame is used as the second anchor frame in error concealment. If no such INTRA-frame is available, algorithm B has to be used. The first anchor frame is the latest reconstructed frame. If dt1 is the temporal distance between the first anchor frame and the missing frame in presentation time and dt2 is the same measure with respect to the second anchor frame, respectively, (y1, u1, v1) is a pixel in the first anchor frame and (y2, u2, v2) is the spatially corresponding pixel in the second anchor frame, a concealed pixel (y, u, v) is then given by:

$$y=clip1((y1*dt2+y2*dt1)/(dt2+dt1)).$$

where u and v are calculated similarly but their sign is taken into account:

$$u=clip1((u1-128)*dt2+(u2-128)*dt1)/(dt2+dt1)+128).$$

where the mathematical function "clip1" is defined as follows:

$$clip1(c) = clip3(0, 255, c)$$

$$clip3(a, b, c) = a \text{ if } c < a$$
$$= b \text{ if } c > b, \text{ or}$$
$$= c \text{ otherwise.}$$

Algorithm B:
Normal spatio-temporal error concealment.

Error concealment of Wipes
The decoder has to detect:
1. the shape of the border(s) between the two scenes involved in the wipe; and
2. the rate defining how fast the ending scene is covered by the starting scene.

The detection can be done by comparing reconstructed pictures, for example, and calculating a correlation block by block. If two spatially corresponding blocks from temporally subsequent pictures are correlated, they are from the same scene. Otherwise they are from different scenes.

Based on the estimated shape and rate, the decoder can calculate a prediction of the location and shape of the border in a missing picture or area. Missing areas that belonged to the ending scene in the previous picture and are estimated to belong to the ending scene in a lost picture/area can be concealed by copying the areas from the previous picture. Similarly, missing areas that belonged to the starting scene in the previous picture and are estimated to belong to the starting scene in a lost picture/area can be concealed by copying the areas from the previous picture. Missing areas that belonged to the ending scene in the previous picture and are estimated to belong to the starting scene in the lost picture/area should be concealed spatially from adjacent contents of the starting scene. When concealing missing areas, boundary matching to adjacent correctly reconstructed blocks can be used as is often done in error concealment.

Error concealment of Other Transition Types

Normal spatio-temporal error concealment method should be used.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method comprising:
    retrieving information indicative of a type of scene transition from an encoded bitstream, the video sequence comprising at least a first scene and a second scene, the second scene comprising a scene transition from the first scene, wherein the scene transition comprises a number of frames and the scene transition is one of a number of scene transition types, wherein the scene transition types comprise at least one of gradual scene transition types; and
    identifying the type of scene transition based on the information for error concealment in a decoding apparatus.

2. A method according to claim 1, wherein the scene transition types further comprise a scene cut and the identified type of scene transition is the scene cut.

3. A method according to claim 2, wherein if a whole picture belonging to the scene cut is lost, the lost picture is not concealed.

4. A method according to claim 2, wherein if part of a picture belonging to the scene cut is lost or corrupted, a spatial error concealment algorithm is applied to conceal the lost or corrupted part of the picture.

5. A method according to claim 1, wherein the identified type of scene transition is one of the gradual scene transition types.

6. A method according to claim 5, wherein the gradual scene transition types comprise is a fade, a dissolve, and a wipe.

7. A method according to claim 5, wherein if a whole picture belonging to the gradual scene transition is lost or corrupted, a spatio-temporal error concealment algorithm is applied to conceal the lost or corrupted part of the picture.

8. A method according to claim 5, wherein if part of a picture belonging to the gradual scene transition is lost or corrupted, a spatio-temporal error concealment algorithm is applied to conceal the lost or corrupted part of the picture.

9. A method according to claim 1, wherein information indicative of the identified scene transition is provided to a decoder in a supplemental enhancement information message so as to allow the decoder to conceal the error based on said information.

10. A method according to claim 9, wherein said information indicative of the identified scene transition includes an indication of a scene transition type.

11. A method according to claim 9, wherein said information indicative of the identified scene transition is provided for each frame belonging to the transition.

12. A video encoding apparatus comprising:
    an identifier module for identifying frames associated with a scene transition, wherein the apparatus configured for encoding a video sequence into an encoded bitstream, the video sequence comprising at least a first scene and a second scene and having the scene transition from the first scene, wherein the scene transition comprises a number of frames and the scene transition is one of a number of scene transition types, wherein the scene transition types comprise at least one of gradual scene transition types; and
    a multiplexing module for providing information indicative of the type of scene transition in the encoded bitstream, for error concealment purposes.

13. A video encoding apparatus according to claim 12, wherein said information is provided in a supplemental enhancement information message.

14. A video encoding apparatus according to claim 13, wherein said information is provided for each frame belonging to the transition.

15. A video decoding apparatus comprising:
    a demultiplexer module for retrieving information identifying a type of scene transition from an encoded bitstream, wherein the apparatus is configured to receive the encoded bitstream and to decode a video sequence from the encoded bitstream, the video sequence comprising at least a first scene and a second scene and the second scene comprising the scene transition from the first scene, wherein the scene transition comprises a number of frames and the scene transition is one of a number of scene transition types, wherein the scene transition types comprise at least one of gradual scene transition types, and wherein the demultiplexer module is configured to provide the information indicative of the identified type of scene transition so as to allow an error concealment algorithm to conceal an error in a frame belonging to the transition based on the type of scene transition.

16. A video decoding apparatus according to claim 15, wherein the type of scene transition is retrieved from a supplemental enhancement information message in the encoded bitstream.

17. A video decoding apparatus according to claim 15, wherein a whole picture belonging to the gradual scene transition is lost or corrupted, said error concealment algorithm comprising a spatio-temporal error concealment algorithm for concealing the lost or corrupted picture.

18. A video decoding apparatus according to claim 15, wherein a part of a picture belonging to the gradual scene transition is lost or corrupted, said error concealment algorithm comprising a spatio-temporal error concealment algorithm for concealing the lost or corrupted part of the picture.

19. A video decoding apparatus according to claim 15, wherein the scene transition types further comprise a scene cut and a part of a picture belonging to the scene cut is lost or corrupted, said error concealment algorithm comprising a spatial error concealment algorithm for concealing error in the picture.

20. A video decoding apparatus according to claim 15, wherein the scene transition types further comprise a scene cut and a whole picture belonging to the scene cut is lost or corrupted, said error concealment algorithm adapted to ignore the lost or corrupted picture.

21. A video decoding apparatus comprising:
   means for receiving an encoded bitstream, wherein the encoded bitstream comprising a video sequence, the video sequence comprising at least a first scene and a second scene and having a scene transition from the first scene, wherein the scene transition comprises a number of frames and the scene transition is one of a number of scene transition types, wherein the scene transition types comprise at least one of gradual scene transition types,
   means for retrieving information from the received encoded bitstream to identify the type of scene transition, and
   means for concealing an error in a frame belonging to the transition based on the information indicative of the identified type of scene transition.

22. A video encoding apparatus comprising:
   means for identifying frames associated with a scene transition, wherein the video encoding apparatus is configured for encoding a video sequence into an encoded bitstream, the video sequence comprising at least a first scene and a second scene and having the scene transition from the first scene, wherein the scene transition comprises a number of frames and the scene transition is one of a number of scene transition types, wherein the scene transition types comprise at least one of gradual scene transition types; and
   means for providing information indicative of the type of transition in the encoded stream for error concealment purposes.

23. A method for encoding a video sequence into an encoded bitstream, comprising:
   identifying in an encoding apparatus frames associated with a scene transition, wherein the video sequence comprises at least a first scene and a second scene and having a scene transition from the first scene, wherein the scene transition comprises a number of frames and the scene transition is one of a number of scene transition types, wherein the scene transition types comprise at least one of gradual scene transition types; and
   providing information indicative of the scene transition type in the encoded bitstream.

24. A method according to claim 23, wherein said information is provided in a message.

25. A method according to claim 23, wherein said information is provided for each frame belonging to the scene transition.

26. A method according to claim 1, further comprising:
   applying an error concealment procedure to conceal an error in a frame belonging to the scene transition based on the identified type of scene transition.

27. A method according to claim 23, wherein the information is used in an error concealment process.

* * * * *